United States Patent [19]

Ushiro et al.

[11] 4,404,595

[45] Sep. 13, 1983

[54] LENS UNIT FOR A CAMERA

[75] Inventors: Tatsuzo Ushiro, Tokyo; Hiroyuki Takimoto, Yokohama, both of Japan

[73] Assignee: Canon Kabushiki Kaisha, Tokyo, Japan

[21] Appl. No.: 221,635

[22] Filed: Dec. 31, 1980

[30] Foreign Application Priority Data

Jan. 15, 1980 [JP] Japan ............................... 55-2861[U]

[51] Int. Cl.$^3$ ............................................. H04N 9/10
[52] U.S. Cl. ...................................... 358/227; 354/25; 358/228
[58] Field of Search ................ 358/55, 225, 227, 228; 354/25, 38, 46, 43, 53, 195, 197, 198, 202, 270, 272, 286; 352/140

[56] References Cited

U.S. PATENT DOCUMENTS

| | | | |
|---|---|---|---|
| 3,435,136 | 3/1969 | Bachmann | 358/227 |
| 3,925,813 | 12/1975 | Toyama | 358/55 |
| 3,940,777 | 2/1976 | Komine | 354/197 |
| 3,968,504 | 7/1976 | Komine | 354/46 |
| 4,171,529 | 10/1979 | Silberberg | 358/225 |
| 4,239,357 | 12/1980 | Iida | 354/198 |
| 4,301,478 | 11/1981 | Sakane | 358/227 |
| 4,326,784 | 4/1982 | Ichiyanagi | 354/198 |

*Primary Examiner*—Michael A. Masinick
*Attorney, Agent, or Firm*—Fitzpatrick, Cella, Harper & Scinto

[57] ABSTRACT

This specification discloses a lens unit for a video camera which is provided with an image pickup lens, an automatic focus adjusting device for automatically focusing the image pickup lens onto an object, an automatic diaphragm device, connection means for connecting the automatic focus adjusting device to a power supply circuit on the camera body side, and connection means for connecting the automatic diaphragm device to a photometry signal (luminance signal) putting-out circuit on the camera body side.

37 Claims, 3 Drawing Figures

LENS UNIT FOR A CAMERA

BACKGROUND OF THE INVENTION

1. Field of the Invention

This invention relates to a lens unit for use with a video camera.

2. Description of the Prior Art

For example, in a handy video camera useful with to a so-called portable video system, as much automatization as possible has been contrived to improve the operability thereof and also, in a home video camera useful with a so-called home video system, as much automatization as possible has been contrived because the users thereof include a number of amateur users who are not well acquainted with video cameras. For instance, automatic diaphragm control, automatic sound volume adjustment, automatic white balance, etc. are the typical examples of such automatization.

On the other hand, in photographic cameras, 8 mm motion picture cameras etc., the automatization of the focus adjustment of the phototaking lens has been actively contrived as the last task left to cameras, in addition to the conventional automatic exposure control.

In accordance with such trend, in video cameras as well, the automatization of the focus adjustment of the image pickup lens has received considerable attention.

SUMMARY OF THE INVENTION

The present invention has been made in view of the above-noted situations and a primary object thereof is to provide very useful and novel improvements in realizing the automatization of various operations in a video camera.

Another object of the present invention is to provide, as a part of the automatization in a video camera, a more practical lens unit for a video camera the utilization of which can render the video camera into a fully automatized without imparting any load to the camera body.

Still another object of the present invention is to provide a more advantageous construction of a more useful lens unit the utilization of which, as a lens unit for contriving the automatization of various operations in a video camera, will liberate the user at least from cumbersome manual operations such as the focusing of the image pickup lens and the adjustment of the diaphragm device and accordingly can greatly contribute to the automatization in the video camera.

Therefore, according to the present invention, there is proposed a more advantageous construction of a lens unit for a video camera which is provided with an image pickup lens, an automatic focus adjusting device for automatically focusing the image pickup lens onto an object, an automatic diaphragm device, connection means for connecting the automatic focus adjusting device to a power supply circuit on the camera body, and connection means for connecting the automatic diaphragm device to a photometry signal (luminance signal) emitting circuit in the camera body.

That is, according to the lens unit of such construction, the use thereof in combination with the camera body eliminates, as an entire video camera, the cumbersome manual operations such as at least the focusing of the image pickup lens and the adjustment of the diaphragm device and accordingly, in this point, this lens unit provides useful means for the automatization of various operations in the video camera, and moreover, in that case, there is obtained an advantage that no load is imparted to the camera body. Particularly, in contriving the automatization of the video camera as a whole, modifying the camera body for sharp changes in design and construction is not preferable in terms of cost and in this respect, according to the lens unit of the present invention, it is almost unnecessary to modify the camera body for sharp changes in design and construction and basically, the conventional camera body can be intactly used and a change, if required at all, may be only very slight and thus, there is obtained an advantage that any increase in cost can be avoided. Also, the lens unit of the present invention, as shown in a preferred embodiment of the invention which will hereinafter be described, can be constructed as an interchangeable lens unit removably mountable with respect to the camera body, and by so constructing the lens unit of the present invention as an interchangeable lens unit and preparing it with other interchangeable lens unit having various different specifications or functions, it is possible to greatly expand the function of the entire video camera and moreover, in that case, the camera body may be of conventional construction and thus, there is obtained an advantage that any increase in cost can be sufficiently avoided.

Still another object of the present invention is to provide further useful improvements relating to the lens unit having the above-described features.

Thus, according to a preferred embodiment of the present invention which will hereinafter be described, there is proposed the construction of a lens unit which is provided with means for transmitting to the camera body a signal representing the adjusted focus condition of the image pickup lens which is provided by the automatic focus adjusting device and/or means for transmitting to the camera body a signal representing the in-focus adjusted distance of the image pickup lens, or means for transmitting to the camera body a signal representing the aperture value which is provided by the automatic diaphragm device to enable the display of the focusing condition of the image pickup lens, the display of the in-focus adjusted distance of the image pickup lens, etc. on the camera body, preferably within the viewfinder, and this is more useful in practice.

According to a further embodiment, there is proposed the construction of a lens unit which, when the image pickup lens is a with zoom lens, is provided zooming drive means for the zoom lens and connection means for connecting the zooming drive means to a zooming control circuit on the camera body, and this is more useful in improving the operability of the video camera. Also, in this case, according to an embodiment, there is proposed the construction of a lens unit which is provided with means for transmitting to the camera body a signal representing the zooming adjusted condition of the zoom lens, and this is useful in the focus display and the distance display as well as the display of the zooming condition on the camera body, preferably within the viewfinder.

Other objects and features of the present invention will become apparent from the following detailed description of embodiments of the invention taken in conjunction with the accompanying drawings.

BRIEF DESCRIPTION OF THE DRAWINGS

Preferred embodiments of the present invention will hereinafter be described with reference to the accompanying drawings, in whic.

DESCRIPTION OF THE PREFERRED EMBODIMENTS

Figure 1:
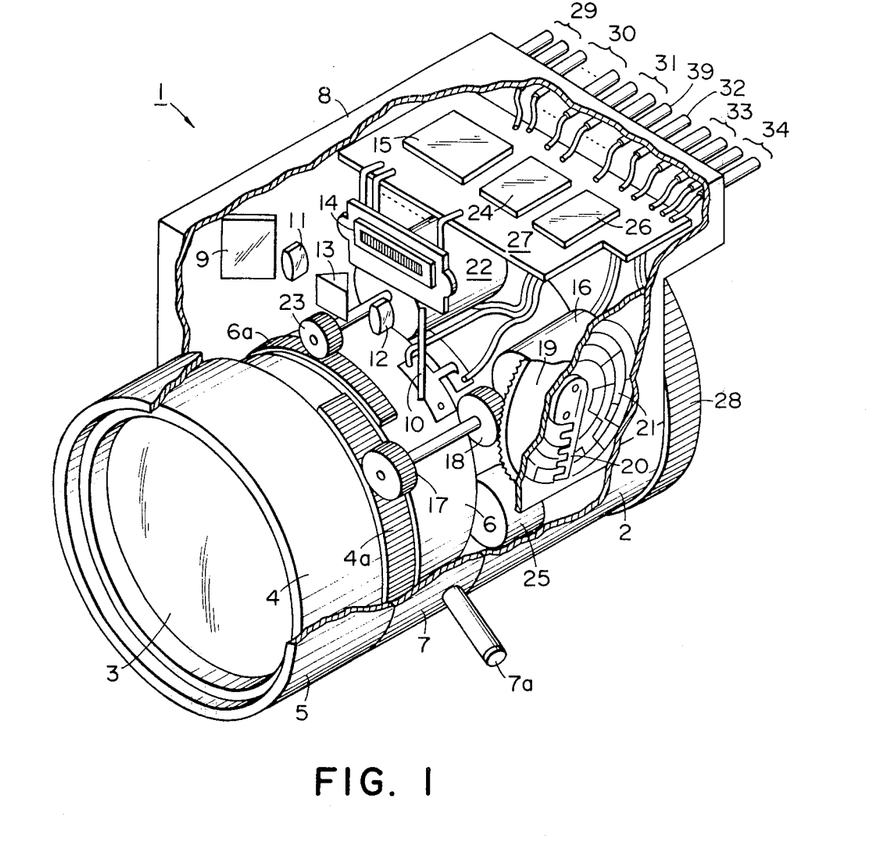
FIG. 1 is a partly broken-away perspective view showing an embodiment of the lens unit according to the present invention.

Reference is first had to FIG. 1 to describe an example of the construction of the lens unit according to the present invention. In FIG. 1, the lens unit is generally designated by 1. Designated by 2 is a lens body constituting the lens unit and provided with a zoom lens system including a focusing lens 3 and a magnification changing lens group (not shown) disposed rearwardly thereof. Denoted by 4 is a focusing ring. By turning this ring, the focusing lens 3 may be moved forwardly or backwardly to thereby effect focusing. Designated by 4a is a gear portion formed in a portion of the focusing ring 4. Reference numeral 5 designates an operating ring for manual focusing which is connected to the focusing ring 4. Denoted by 6 is a zooming ring. By turning this zooming ring, the aforementioned magnification changing lens group may be moved, as is well-known, to thereby effect zooming. Designated by 6a is a gear portion formed in a portion of the zooming ring 6. Reference numeral 7 designates an operating ring for manual zooming which is connected to the zooming ring 6 and which has an operating rod 7a studded thereon.

Denoted by 8 is a housing attached to the lens body 2. Various devices to be described are contained in the housing 8. Reference numerals 9 and 10 denote mirrors obliquely (45°) respectively disposed in opposed relation with range finding windows 8a and 8b (FIG. 2) formed in the front face of the housing 8 with a predetermined base line interval intervening therebetween, reference numerals 11 and 12 designate imaging lenses for receiving the lights from the mirrors 9 and 10, respectively to form detection images for range finding, and reference numeral 13 designates a reflection prism for reflecting and deflecting the image light beams from the imaging lenses. These together constitute a so-called base line range finder type range finding optical system, and a linear image sensor 14 such as a CCD or the like is disposed at a position for receiving the two imaging light beams from the prism 13 (exactly, on the focal planes of the imaging lenses 11 and 12).

Designated by 15 is a distance and focal point detecting circuit for receiving the image scanning output from the image sensor 14 to detect the distance to an object and for detecting the focus adjusted conditions of the focusing lens 3, namely, the conditions of in-focus, near focus and far focus, on the basis of the then distance detection result data and a position data representing the position on the optical axis of the focusing lens 3 obtained by a construction which will later be described. The distance and focal point detecting circuit 15 is placed as an IC chip on a circuit substrate 27.

Denoted by 16 is a focusing motor for automatic focus adjustment operable to adjust the focusing lens 3 so as to be focused with respect to an object on the basis of a focus control signal emitting by the distance and focal point detecting circuit 15. A drive gear 17 mounted on the end of the output shaft of the focusing motor 16 is in mesh engagement with the gear portion 4a of the focusing ring 4. Designated by 19 is a crown gear rotatable in accordance with the adjusted position of the focusing lens 3 by a gear 18 mounted on the intermediate portion of the output shaft of the focusing motor 16. The crown gear 19 has attached thereto a brush 20 slidably contacting a gray code plate (position encoder) 21 comprising a combination of the patterns of a conductive portion and a non-conductive portion for indicating the position on the optical axis of the focusing lens 3 in a digital word of a predetermined bit number and accordingly, through the brush 20, a position data representing the position on the optical axis of the focusing lens 3 is obtained as a digital signal of a predetermined bit number and this is applied as input to the distance and focal point detecting circuit 15.

What has been described above constitutes an automatic focus adjusting device. The aforementioned distance and focal point detecting circuit 15 is designed to detect the relative positional relation between two images formed by the range finding optical system (9–13), on the basis of the image scanning signal regarding said two images which signal is emitted by the image sensor 14, thereby detecting the object distance, and to compare the digital distance data obtained at this time with the digital position data regarding the position of the focusing lens 3 which is obtained through the brush 20, thereby detecting the focus adjusted condition of the focusing lens 3, and specifically, it can adopt the circuit construction as disclosed, for example, in U.S. application Ser. No. 121,690 filed on Feb. 15, 1980 by the assignee of the present invention.

Reference numeral 22 designates a zooming motor. A drive gear 23 mounted on the end of the output shaft of this zooming motor 22 is in mesh engagement with the gear portion 6a of the zooming ring 6. Designated by 24 is a motor control circuit for the zooming motor 22 which is placed on the circuit substrate 27. Denoted by 25 is an iris motor for automatically adjusting an unshown iris diaphragm incorporated in the lens body 2. The iris motor 25 is connected to the iris diaphragm through means, not shown. Designated by 26 is a motor control circuit for the iris motor 25. It is placed on the circuit substrate 27.

The above-described various devices are contained in the housing 8.

Reference numeral 28 designates a clamp ring (or bayonet or screw mount means) as clamping means for mounting the lens unit 1 onto the lens unit mount portion of a video camera body, reference numerals 29–34 denote a group of terminals provided on the rear end surface of the housing 8 to make electrical connections between the above-described various devices contained in the housing 8 and the circuit in the camera body when the lens unit 1 is mounted onto the camera body, reference numeral 29 designates a connection terminal for connecting the distance and focal point detecting circuit 15 to the power source circuit of the camera body, reference numeral 30 denotes an output terminal for delivering to the camera body the focus control signal put out from the distance and focal point detecting circuit 15, reference numeral 31 designates an output terminal for transmitting to the camera body the data representing the position of the focusing lens 3 obtained through the brush 20 as a data representing the in-focus adjusted distance of the focusing lens 3, reference numeral 32 denotes an output terminal for transmitting to the camera body an electrical signal representing the zooming condition of the magnification changing lens group, reference numeral 33 designates a connection terminal for connecting the zooming motor control circuit 24 to the zooming direction indicating circuit of the camera body, reference numeral 34 denotes a connection terminal for connecting the iris motor control circuit 26 to the metering signal output circuit of the camera body, and reference numeral 39 designates an output terminal for transmitting to the camera body an electrical signal representing the aperture value of the diaphragm device.

Figure 2:
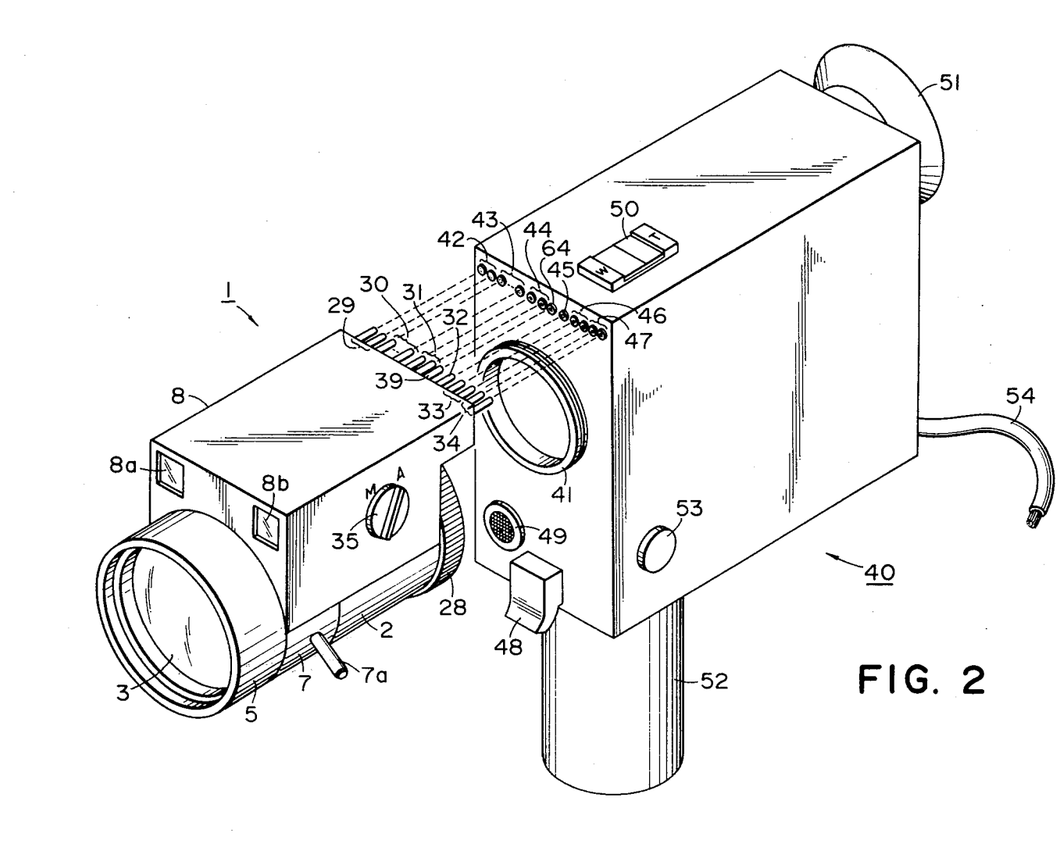
FIG. 2 is a perspective view showing the relation between the lens unit and a camera body with which the lens unit is usable.

Reference is now had to FIG. 2 to describe the relation between the lens unit 1 of the above-described construction and the video camera body with which the lens unit is usable. In FIG. 2, the video camera body is generally designated by 40, and this is provided with a lens unit mount portion 41 for mounting the lens unit 1 thereon and a group of connectors 42–47 and 64 corresponding to the group of terminals 29–34 and 39 of the lens unit 1. As will later be seen from FIG. 3, among the group of connectors 42–47 and 64, the connector 42 is connected to the power source circuit of the camera, the connectors 43, 44, 45 and 64 are connected to an information display circuit, the connector 46 is connected to a zooming direction indicating circuit, and the connector 47 is connected to a photometry signal emitting circuit, and during the mounting of the lens unit 1 onto the camera body 40, the terminals 29, 30, 31, 32, 33, 34 and 39 of the lens unit 1 are connected to the connectors 42, 43, 44, 45, 46, 47 and 64, respectively. Reference numeral 48 designates the trigger button of the camera, reference numeral 49 a microphone, reference numeral 50 an operating button for zooming, reference numeral 51 an eye cup for the viewfinder, reference numeral 52 the hand grip of the camera, reference numeral 53 an operating button for automatic white balance, and reference numeral 54 a cable for connecting the camera to a video recorder, not shown.

In the lens unit 1, reference numeral 35 designates an operating switch button for selecting the automatic focusing and the manual focusing. In the "A" position (automatic focusing mode) of this switch button, the aforementioned automatic focus adjusting device is put into its operative mode to enable the automatic focusing, and in the "M" position (manual focusing mode) of this button, the automatic focus adjusting device is put into its inoperative mode to enable the manual focusing.

Figure 3:
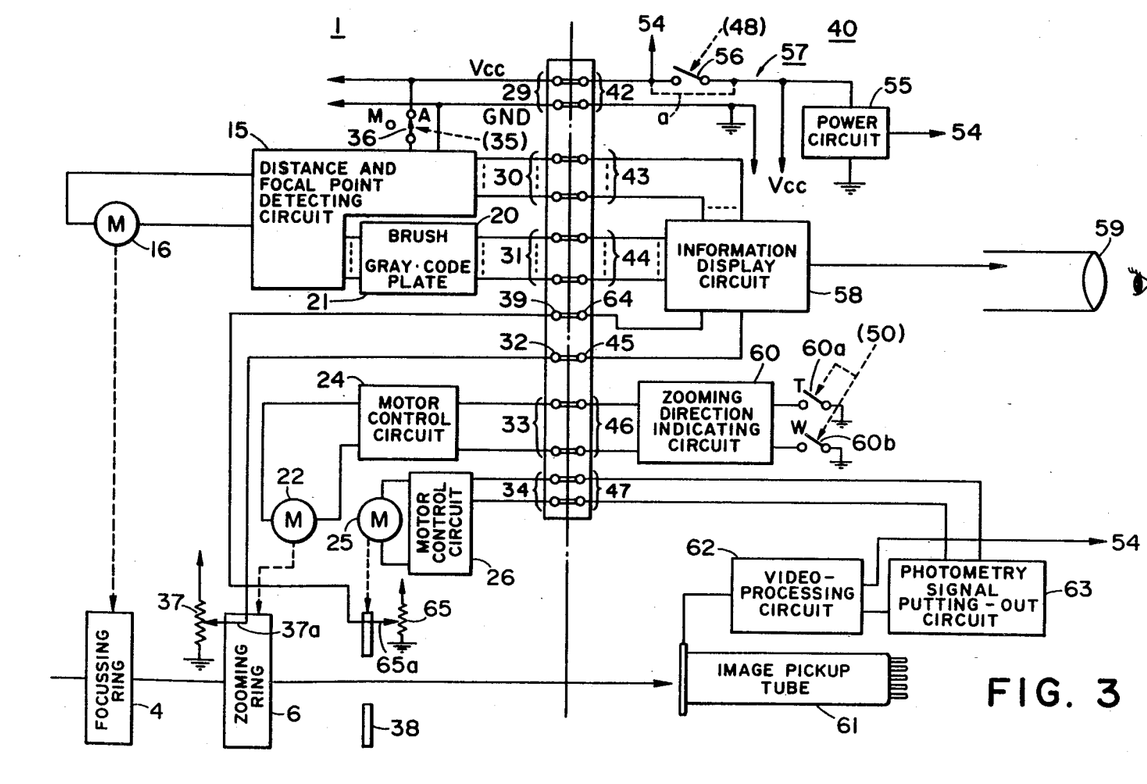
FIG. 3 is a block circuit diagram showing the relations in electrical connection between the electric circuit systems of the lens unit and the camera body when the lens unit has been mounted to the camera body.

Reference is now had to FIG. 3 to describe the electrical connection between the electric circuit systems of the lens unit 1 and the camera body 40 when the lens unit has been mounted onto the camera body. First, on the camera body 40, the connector 42 is connected, for example, to a power supply circuit 57 including a power circuit 55 and a trigger switch 56 adapted to be closed by operation of the trigger button 48 and accordingly, when the operating button 35 is set to the "A" position on the lens unit 1 side, power is supplied to the distance and focal point detecting circuit 15 through the connection between the connector 42 and the terminal 29 by the closing of the trigger switch 56 resulting from the depression of the trigger button 48, whereby the distance and focal point detecting circuit 15 is operated to enable the automatic focus adjustment of the focusing lens 3. In the lens unit 1, reference numeral 36 designates a switch changeable over between a terminal A and a terminal M by operation of the operating button 35. When the switch 36 has been changed over to the terminal A side, the power supply to the circuit 15 becomes possible (namely, the automatic focusing mode) and, when the switch 36 has been changed over to the terminal M side, this power supply becomes impossible (namely, the manual focusing mode). Reference numeral 58 denotes an information display circuit for effecting within the viewfinder of the camera the display of various types of information such as the focus adjusted condition of the focusing lens 3, the in-focus adjusted distance thereof, the aperture value of the diaphragm device and the zooming condition of the magnification changing lens group. Applied as inputs to this information display circuit 58 are the signal representing the focus adjusted condition of the focusing lens 3 (focus control signal) from the distance and focal point detecting circuit 15 through the connection between the terminal 30 and the connector 43, the signal representing the in-focus adjusted distance of the focusing lens 3 (the data regarding the position of the focusing lens 3) from the brush 20 through the connection between the terminal 31 and the connector 44, the signal representing the aperture value of the diaphragm device through the connection between the terminal 39 and the connector 64, and the signal representing the zooming condition of the magnification changing lens group through the connection between the terminal 32 and the connector 45, and the display circuit 58 effects the display of the above-mentioned various types of information on the basis of the above-mentioned input signals. The construction of the well-known digital display circuit or the like is applicable as the display circuit 58 and therefore, the details thereof need not be disclosed herein. Also, in this case, the generation source of the signal representing the aperture value of the diaphragm device on the lens unit 1 and the generation source of the signal representing the zooming condition of the magnification changing lens group are respectively, for example, a potentiometer 65 operatively associated with the iris diaphragm 38 and a potentiometer 37 operatively associated with the zooming ring 6, and the slidable taps 65a and 37a of these potentiometers are connected to the terminals 39 and 32, respectively, but besides this, digital aperture value data emitting means similar to the digital position data emitting means comprising the gray code plate 21 and the brush 20 and digital zooming data emitting means may be provided so that signals representing the aperture value and the zooming condition are respectively emitting as digital data. Designated by 59 is an eye-piece lens for the viewfinder. Denoted by 60a and 60b are zooming switches adapted to the selectively closed by operation of a zooming operating button 50. The switch 60a is, for example, a telephoto side switch, and the switch 60b is, for example, a wide side switch, and these are connected to a zooming direction indicating circuit 60. In response to the closing of the switches 60a and 60b, the zooming direction indicating circuit 60 emits a signal indicating the zooming direction and said signal is applied as input to the zooming motor control circuit 24 of the lens unit 1 through the connection between the connector 46 and the terminal 33, and the zooming motor 22 is controlled by the output of the circuit 24 and after all, zooming is effected in a direction corresponding to the closing of the switches 60a, 60b on the camera body 40. Both the zooming direction indicating circuit 60 and the zooming motor control circuit 24 are known per se and therefore, the details thereof need not be disclosed herein.

Reference numeral 61 designates an image pickup tube, reference numeral 62 denotes a video-processing circuit, and reference numeral 63 designates a photometry signal (luminance signal) emitting circuit for receiving the luminance signal from the video-processing circuit 62 and emitting a photometry signal (luminance signal). The output of the photometry signal circuit 63 is imparted to the iris motor control circuit 26 of the lens unit 1 through the connection between the connector 47 and the terminal 34, and the iris motor 25 is controlled by the circuit 26 so that the iris diaphragm 38 in the lens body 2 is automatically adjusted. The video-processing circuit 62, the photometry signal (luminance signal) emitting circuit and the iris motor control circuit 26 are all known per se and therefore, the details thereof need not be described herein.

Now, as will be appreciated from the above-described construction, according to said lens unit 1, a video camera having the automatic focus adjusting function, the automatic aperture control function and the automatic zooming function can be constructed simply by mounting the lens unit 1 onto the camera body 40 and further, the display of various types of information such as the focus adjusted condition, the in-focus adjusted distance and the zooming condition of the phototaking lens can be accomplished more easily.

The above-described embodiment shows an example of the case where the lens unit of the present invention is constructed as an interchangeable lens unit removably mountable with respect to the camera body, but besides this, the lens unit of the present invention may also be constructed, for example, as a unit fixed assembled to the camera body, and of course, the present invention is not restricted to the construction of the illustrated embodiment, but various modifications may be made within the scope of the spirit of the present invention.

Some changes in the above-described embodiment will be supplementally described. For example, in the connection between the circuits shown in FIG. 3, the distance and focal point detecting circuit 15 in the lens unit 1 is designed to be supplied with electrical power from the electrical power circuit 55 only when the lens unit 1 has been mounted to the camera body 40 and the trigger switch 56 has been closed by operation of the trigger button 48, but design may also be made such that, for example, as shown by broken line a in FIG. 3, simply by mounting the lens unit 1 to the camera body 40, the distance and focal point detecting circuit 15, with the other circuits 24 and 26, is supplied with power from the power circuit 55 not through the switch 56. That is, in this case, the operation or non-operation of the distance and focal point detecting circuit 15 depends only on the change-over of the switch 36 and accordingly, such a wasteless, rational use becomes possible that prior to image pickup, the automatic focus adjusting device is operated to effect the automatic focusing of the phototaking lens in advance, whereafter image pickup is actually started.

Incidentally, the power circuit 55 of the camera body 40 side, when used with an extraneous power source device or a video tape recorder, as in well-known, is supplied with power from the power source device contained in the video tape recorder through the cable 54 in response to the opening-closing of the power switch belonging to the power source device, and when the camera is used with the video tape recorder, the trigger switch 56 is used to control the video recording operation on the video tape recorder side.

What we claim is:

1. A lens assembly for use with a camera body having electrical power supply circuit means, measured light signal providing means and zooming control means, said lens assembly comprising:
   (A) a focus adjustable zoom lens system for image pick-up;
   (B) an automatic focusing device for automatically adjusting the focus of said lens system onto an object;
   (C) an automatic diaphragm device for automatically adjusting a diaphragm aperture in accordance with the measured light signal provided by said light signal providing means;
   (D) an automatic zooming device for driving, under the control of said zooming control means, said lens system to effect zooming;
   (E) means for connecting said automatic focusing device to said electric power supply circuit means;
   (F) means for connecting said automatic diaphragm device to said measured light signal providing means; and
   (G) means for connecting said automatic zooming device to said zooming control means.

2. A lens assembly according to claim 1, wherein said lens assembly is constructed as a unit separable with respect to said camera body and further comprises means for removably mounting said lens assembly to said camera body.

3. A lens assembly according to claim 1 or 2, wherein said automatic focusing device includes focus detecting means for producing an electrical indication representing the focusing condition of said lens system; and said lens assembly further comprises means for transmitting to said camera body said electrical indication representing the focusing condition of the lens system which is produced by said focus detecting means, said transmitting means being electrically connected to said focus detecting circuit means.

4. A lens assembly according to claim 1 or 2, wherein said automatic focusing device includes in-focus distance indication producing means for producing an electrical indication representing the in-focus distance of said lens system; and said lens assembly further comprises means for transmitting to said camera body said electrical indication representing the in-focus distance of the lens system which is produced by said in-focus distance indication producing means, said transmitting means being electrically connected to said in-focus distance signal producing means.

5. A lens assembly according to claim 1 or 2, wherein said automatic diaphragm device includes aperture value indication producing means for producing an electrical indication representing the adjusted diaphragm aperture value; and said lens assembly further comprises means for transmitting to said camera body said electrical indication representing the adjusted aperture value which is produced by said aperture value indication producing means, said transmitting means being electrically connected to said aperture value signal producing means.

6. A lens assembly according to claim 1 or 2, wherein said automatic zooming device includes zooming condition detecting means for producing an electrical indication representing the zooming condition of said lens system; and said lens assembly further comprising means for transmitting to said camera body said electrical indication representing the zooming condition of the lens system which is produced by said zooming condition detecting means, said transmitting means being electrically connected to said zooming condition detecting means.

7. A lens assembly according to claim 1 or 2, wherein said automatic focusing device has an operative state and an inoperative state, and said lens assembly further comprises:
manually operable switching means coupled to said automatic focusing device for switching the focusing device between the operative stage and the inoperative state.

8. A lens assembly according to claim 7, further comprising:
manually operable focusing means coupled to said lens system for manually focusing the lens system.

9. A lens assembly according to claim 3, wherein said automatic focusing device has an operative state and an inoperative state, and said lens assembly further comprises:
manually operable switching means coupled to said automatic focusing device for switching the focusing device between the operative state and the inoperative state.

10. A lens assembly according to claim 9, further comprising:
manually operable focusing means coupled to said lens system for manually focusing the lens system.

11. A lens assembly according to claim 4, wherein said automatic focusing device has an operative state and an inoperative state, and said lens assembly further comprises:
manually operable switching means coupled to said automatic focusing device for switching the focusing device between the operative state and the inoperative state.

12. A lens assembly according to claim 11, further comprising:
manually operable focusing means coupled to said lens system for manually focusing the lens system.

13. A lens assembly for use with a camera body having electrical power supply circuit means and information display means, said lens assembly comprising:
(A) a focus adjustable picture-taking lens system;
(B) an automatic focusing device for automatically adjusting the focus of said lens system onto an object, said automatic focusing device including focus detecting means for producing an electrical output representing the focusing condition of said lens system;
(C) means for connecting said automatic focusing device to said electrical power supply circuit means; and
(D) means for connecting the output of said focus detecting means in said automatic focusing device to said information display means to enable the display means to indicate the focusing condition of said lens system in accordance with the electrical output of said focus detecting means.

14. A lens assembly according to claim 13, wherein said lens assembly is constructed as a unit separable with respect to said camera body and further comprises means for removably mounting said lens assembly to said camera body.

15. A lens assembly according to claim 13 or 14, wherein said camera body further has measured light signal providing means, and said lens assembly further comprises:
an automatic diaphragm device for automatically adjusting a diaphragm aperture in accordance with the measured light signal provided by said measured light signal providing means; and
means for connecting said automatic diaphragm device to said measured light signal providing means.

16. A lens assembly according to claim 15, wherein said automatic diaphragm device includes aperture value information producing means for producing an electrical output representing the adjusted diaphragm aperture value, and said lens assembly further comprises means for connecting the output of said aperture value information producing means to said information display means to enable the display means to display the diaphragm aperture value adjusted by the diaphragm device, on the basis of said electrical output of the aperture value information producing means.

17. A lens assembly according to claim 15, wherein said lens system includes a zoom portion and said camera body further has zooming control means, and wherein said lens assembly further comprises:
an automatic zooming device for driving, under the control of said zooming control means, said zoom portion of the lens system to effect zooming; and
means for connecting said automatic zooming device to said zooming control means.

18. A lens assembly according to claim 17, wherein said automatic zooming device includes zooming condition detecting means for producing an electrical output representing the zooming condition of said lens system, and said lens assembly further comprises means for connecting the output of said zooming condition detecting means to said information display means to enable the display means to indicate the zooming condition of the lens system in accordance with said electrical output of the zooming condition detecting means.

19. A lens assembly according to claim 13 or 14, wherein said lens system includes a zoom portion and said camera body further has zooming control means, and wherein said lens assembly further comprises:
an automatic zooming device for driving, under the control of said zooming control means, said zoom portion of the lens system to effect zooming; and
means for connecting said automatic zooming device to said zooming control means.

20. A lens assembly according to claim 19, wherein said automatic zooming device includes zooming condition detecting means for producing an electrical output representing the zooming condition of said lens system, and said lens assembly further comprises means for connecting the output of said zooming condition detecting means to said information display means to enable the display means to indicate the zooming condition of the lens system in accordance said electrical output of the zooming condition detecting means.

21. A lens assembly according to claim 13 or 14, wherein said automatic focusing device includes in-focus distance information producing means for producing an electrical output representing the in-focus distance of said lens system, and said lens assembly further comprises means for connecting the output of said in-focus distance information producing means to said information display means to enable the display means to display the in-focus distance of the lens system in accordance with said electrical output of the in-focus distance information producing means.

22. A lens assembly according to claim 21, wherein said automatic focusing device has an operative and an inoperative state and said lens assembly further comprises;
   manually operable switching means coupled to said automatic focusing device for switching the focusing device between the operative state and the inoperative state.

23. A lens assembly according to claim 22, further comprising:
   manually operable focusing means coupled to said lens system for manually focusing the lens system.

24. A lens assembly according to claim 13 or 14, wherein said automatic focusing device has an operative state and an inoperative state, and said lens assembly further comprises:
   manually operable switching means coupled to said automatic focusing device for switching the focusing device between the operative state and the inoperative state.

25. A lens assembly according to claim 24, further comprising:
   manually operable focusing means coupled to said lens system for manually focusing the lens system.

26. A camera comprising in combination:
   (A) a camera body, having;
      (A-1) electrical power supply circuit means; and
      (A-2) information display means;
   (B) a lens assembly, having;
      (B-1) a focus adjustable picture-taking lens system; and
      (B-2) an automatic focusing device for automatically adjusting the focus of said lens system onto an object, said automatic fucosing device including focus detecting means for producing an electrical output representing the focusing condition of said lens system; and
   (C) a coupling device between said camera body and said lens assembly, and having;
      (C-1) means for connecting said camera body and said lens assembly;
      (C-2) means for electrically connecting said automatic focusing device and said electrical power supply circuit means; and
      (C-3) means for electrically connecting the output of said focus detecting means on said automatic focusing device and said information display means to enable the display means to indicate the focusing condition of said lens system in accordance with said electrical output of the focus detecting means.

27. A camera according to claim 26, wherein said lens assembly is constructed as a unit separable with respect to said camera body.

28. A camera according to claim 26 or 27, wherein said camera body further has light measuring means for providing a measured light signal related to an object light; wherein said lens assembly further has an automatic diaphragm device for automatically adjusting a diaphragm aperture in accordance with the measured light signal provided by said light measuring means; and wherein said coupling device further has means for electrically connecting said automatic diaphragm device with said light measuring means.

29. A camera according to claim 28, wherein said automatic diaphragm device includes aperture value information producing means for producing an electrical output representing the adjusted diaphragm aperture value; and wherein said coupling device further has means for electrically connecting the output of said aperture value information producing means and said information display means to enable the display means to display the diaphragm aperture value adjusted by the diaphragm device, in accordance with of said electrical output of the aperture value information producing means.

30. A camera according to claim 26 or 27, wherein said lens system includes a zoom portion; wherein said camera body has zooming control means; wherein said lens assembly further has an automatic zooming device for driving, under the control of said zooming control means, said zoom portion of the lens system to effect zooming; and wherein said coupling means further has means for electrically connecting said automatic zooming device and said zooming control means.

31. A camera according to claim 29, wherein said automatic zooming device includes zooming condition detecting means for producing an electrical output representing the zooming condition of said lens system; and wherein said coupling device further has means for electrically connecting the output of said zooming condition detecting means and said information display means to enable the display means to indicate the zooming condition of the lens system in accordance with said electrical output of the zooming condition detecting means.

32. A camera according to claim 26 or 27, wherein said automatic focusing device includes in-focus distance information producing means for producing an electrical output representing the in-focus distance of said lens system; and said coupling device further has means for electrically connecting the output of said in-focus distance information producing means and said information display means to enable the display means to display the in-focus distance of the lens system in accordance with said electrical output of the in-focus distance information producing means.

33. A camera according to claim 26 or 27, wherein said automatic focusing device has an operative and an inoperative state, and said lens assembly further has manually operable switching means coupled to said automatic focusing device for switching the focusing device between the operative state and the inoperative state.

34. A camera according to claim 33, wherein said lens assembly further has manually operable focusing means coupled to said lens system for manually focusing the lens system.

35. A camera comprising in combination:
   (A) a camera body, having:
      (A-1) electrical power supply circuit means;
      (A-2) light measuring means for providing a measured light signal related to an object light;
      (A-3) zooming control means;
   (B) a lens assembly, having;
      (B-1) a focus adjustable zoom lens system for image pick-up;
      (B-2) an automatic focusing device for automatically adjusting the focus of said lens system onto an object;
      (B-3) an automatic device for automatically adjusting a diaphragm aperture in accordance with the measured light signal provided by said light measuring means; and (B-4) an automatic zooming device for driving, under the control of said zooming control means, said lens system to effect zooming; and (C) a coupling device between said camera body and said lens assembly, and having:

(C-1) means for connecting said camera body and said lens assembly;

(C-2) means for electrically connecting said automatic focusing device and said power supply circuit means;

(C-3) means for electrically connecting said automatic diaphragm device and said light measuring means; and (C-4) means for electrically connecting said automatic zooming device and said zooming control means.

36. A camera according to claim 35, wherein said lens assembly is constructed as a unit seprate with respect to said camera body.

37. A camera according to claim 35 or 36, wherein said automatic focusing device includes focus detecting means for producing an electrical indication representing the focusing condition of said lens system; and wherein said coupling device further has means for transmitting to said camera body said electrical indicationl representing the focusing condition of the lens system which is produced by said focus detecting means.

* * * * *

UNITED STATES PATENT AND TRADEMARK OFFICE
CERTIFICATE OF CORRECTION

PATENT NO. : 4,404,595

DATED : September 13, 1983

INVENTOR(S) : TATSUZO USHIRO, ET AL.

It is certified that error appears in the above-identified patent and that said Letters Patent is hereby corrected as shown below:

Column 1, line 38, delete "into a".

Column 2, line 18, "unit" should read --units--;
         line 47, after "provided" insert --with--;
         line 50, "on" should read --in--;
         line 68, "whic" should read --which--.

Column 3, line 68, "emitting" should read --emitted--.

Column 5, line 44, after "button" insert --35--.

Column 7, lines 34,35, delete "assembled".

Column 9, line 14, Claim 7, "stage" should read --state--.

Column 10, line 20, Claim 16, "on the basis of said" should read --in accordance with the--;
         line 58, Claim 20, after "accordance" insert --with--.

Column 11, line 36, Claim 26, "fucosing" should read --focusing--.

Column 12, line 8, Claim 29, after "with" delete "of";
         line 65, Claim 35, after "automatic" insert --diaphragm--.

UNITED STATES PATENT AND TRADEMARK OFFICE
CERTIFICATE OF CORRECTION

PATENT NO. : 4,404,595

DATED : September 13, 1983

INVENTOR(S) : TATSUZO USHIRO, ET AL.

It is certified that error appears in the above-identified patent and that said Letters Patent is hereby corrected as shown below:

```
Column 14, line 5, Claim 36, "seprate" should read
                         --separable--;
         lines 12,13, Claim 37, "indication1" should read
                         --indication--.
```

Signed and Sealed this

Fourteenth Day of February 1984

[SEAL]

Attest:

GERALD J. MOSSINGHOFF

Attesting Officer        Commissioner of Patents and Trademarks